United States Patent [19]
Hammond

[11] Patent Number: 5,625,545
[45] Date of Patent: Apr. 29, 1997

[54] MEDIUM VOLTAGE PWM DRIVE AND METHOD

[75] Inventor: Peter W. Hammond, Greensburg, Pa.

[73] Assignee: Halmar Robicon Group, New Kensington, Pa.

[21] Appl. No.: 203,803

[22] Filed: Mar. 1, 1994

[51] Int. Cl.[6] .................................................. H02M 7/515
[52] U.S. Cl. ............................................... 363/71; 363/65
[58] Field of Search .................................. 363/65, 67, 68, 363/69, 70, 71, 72

[56] References Cited

U.S. PATENT DOCUMENTS

| | | |
|---|---|---|
| 4,454,573 | 6/1984 | Petsch et al. . |
| 4,480,299 | 10/1984 | Muto et al. . |
| 4,491,768 | 1/1985 | Slicker . |
| 4,599,550 | 7/1986 | Robertson, Jr. et al. . |
| 4,617,675 | 10/1986 | Ashikaga et al. . |
| 4,674,024 | 6/1987 | Paice et al. ............................ 363/71 |
| 4,849,871 | 7/1989 | Wallingford . |
| 4,894,763 | 1/1990 | Ngo . |
| 4,965,504 | 10/1990 | Ueda et al. . |
| 4,975,822 | 12/1990 | Lipman ................................. 363/72 |
| 4,994,950 | 2/1991 | Gritter . |
| 5,008,797 | 4/1991 | Patel et al. ............................ 363/65 |
| 5,053,690 | 10/1991 | Mutoh et al. . |
| 5,070,292 | 12/1991 | Goff . |
| 5,079,687 | 1/1992 | Sakisaka et al. . |
| 5,099,409 | 3/1992 | Bando et al. ......................... 363/68 |
| 5,155,671 | 10/1992 | Inaba et al. . |
| 5,155,672 | 10/1992 | Brown . |
| 5,214,366 | 5/1993 | Hollmann ............................. 363/71 |
| 5,250,890 | 10/1993 | Tanamachi et al. . |

FOREIGN PATENT DOCUMENTS 2-202324  8/1990  Japan .

OTHER PUBLICATIONS

Bose, Bimel K. "Power Electronics—A Technology Matter", Proceedings of the IEEE, vol. 80, No. 8, pp. 1303–1334 Aug. 1992.

*Primary Examiner*—Peter S. Wong
*Assistant Examiner*—Y. J. Han
*Attorney, Agent, or Firm*—Buchanan Ingersoll, P.C.

[57] ABSTRACT

An electric drive apparatus and method for controlling medium-voltage alternating current motors wherein a multi-phase power transformer having multiple secondary windings provides multi-phase power to multiple power cells, each of which have a single-phase output and are controllable by a modulation controller. The primary and secondary windings in the power transformer may be star- or mesh-connected; the secondary windings may be shifted in phase. Because the power cells are connected in series, the maximum output voltage for each cell may be less than the maximum line-to-line voltage. The power cells can have a tri-state output which can be controlled using pulse-width modulation techniques. AC input power is converted to DC output power for each output phase. Output power modulation can be produced by interdigitating a selected number of carrier signals so that harmonic components reflected back to the input are attenuated.

48 Claims, 11 Drawing Sheets

MEDIUM VOLTAGE PWM DRIVE AND METHOD

BACKGROUND OF THE INVENTION

1. Field of the Invention

This invention relates to a variable-speed motor drive, and a method for operating a variable-speed motor drive, particularly to motor drives employing pulse-width modulation (PWM) driving methods, and especially to medium-voltage AC motor drives employing PWM driving methods.

2. Description of the Prior Art

In general, existing AC medium-voltage variable-speed drives for induction motors use a variation of current source topology, with a phase-controlled SCR input stage and a 6-pulse or 12-pulse output. This topology may sometimes have the drawbacks of harmonic line currents, a variable power factor, and motor torque pulsations. These traits are especially problematic at higher power levels typical for medium voltage motor drives. Because of these and other disadvantages of the current source topology, pulse width modulated (PWM) circuits are preferred to provide motor control. Pulse width modulation is a form of modulation in which the value of each instantaneous sample of the modulating wave is caused to modulate the duration of a pulse. In PWM, the modulating wave may vary the time of occurrence of the leading edge, the trailing edge, or both edges of the pulse. The modulating frequency may be fixed or variable.

In a PWM circuit, a reference signal may be used to generate a train of pulses, the width of each pulse being related to the instantaneous value of the reference signal. The pulses may be generated by using a comparator to compare the reference signal with a carrier signal, which may be a saw tooth or triangular wave. When the reference signal exceeds the carrier signal, the output of the comparator is high; at other times, the output of the comparator is low. The comparator output does provide a train of pulses representing the reference signal. The pulses are then used to drive an electronic switching device for intermittently applying a voltage across the load.

One problem associated with some PWM circuits is current ripple. When a voltage is suddenly applied across an inductive and resistive load, such as an electric motor, the current through the motor rises almost linearly with time. When the voltage is then turned off, the current through the motor does not immediately fall to zero, but decreases approximately linearly with time, as the inductor's magnetic field collapses. Thus, the input voltage pulses applied across the load result in a current which has a ripple. This ripple is inherent to all PWM amplifiers. The magnitude of the ripple is directly proportional to the supply voltage and inversely proportional to the switching frequency and the inductance of the motor. Current ripple is undesirable because it wastes energy in the motor and may cause torque pulsations in the motor. The ripple current waveform has both a wanted component and an unwanted component due to ripple. Only the wanted component does useful work in the motor. If the current has any ripple, the RMS value is larger than the wanted value. The difference between the RMS current and the wanted current contributes only to wasteful heating of, and torque pulsations in, the motor, thus reducing efficiency. In order to achieve maximum efficiency, the wanted and RMS currents generally should be equal. This conditions occurs when there is no ripple, i.e., when the output follows the reference exactly.

The electronic switches used in PWM circuitry can be arranged in a bridge circuit to connect the power source to the load. Typically, the bridges are connected such that, at certain moments, the respective contributions to the voltage applied to the load by the right and left bridge poles cancel each other, and, at other moments, the contributions have the same polarity. The net result is that the voltage applied across the load is zero during those moments when both bridge poles have the same polarity, and is equal to the supply voltage at all other times.

SUMMARY OF THE INVENTION

The invention provides for a medium-voltage driver for use with a three-phase AC motor, and a method for operating such a driver. The driver employs multiple power cells in each phase output line to the three-phase AC motor. The power cells on any given phase output line can be connected serially. The return end of each group of power cells can be connected to a floating neutral in a star configuration. Three-phase AC input power can be supplied to each cell by way of a transformer, which may contain multiple three-phase secondary winding circuits each of which may be dedicated to supply one corresponding power cell with three-phase AC power input. Each power cell can control the power that it supplies to the load using a PWM scheme. It may be desirable to lower the supply transformer's K-factor and to reduce harmonics in the source currents. This can be accomplished by shifting the phase-angle of the secondary winding circuits either by zig-zag, or extended delta windings, as shown.

Each power cell may contain an input AC-to-DC rectifier, a smoothing filter, an output DC-to-AC converter, and a control circuit. The input rectifier accepts three-phase AC input from a secondary winding circuit of the power transformer. The input rectifier transforms three-phase AC power into DC power with significant ripple. To ameliorate the effects of such ripple, a smoothing filter, preferably composed of electrolytic capacitors, may be connected to the DC side of the input rectifier. The smoothing filter also connects to the output converter. It is preferred that the output converter be a single-phase H-bridge semiconductor switches, in particular, of power transistors, such as, for example, IGBTs. Each transistor of the output converter may be operated by a local modulation control circuit. Signals that operate the local modulator control circuit may be brought to each power cell by fiber optic links from a master modulation controller. Power for the local modulator control circuit may be obtained within the power cell from the AC power supply.

In one presently preferred embodiment, each power cell may be constructed internally to low voltage standards. By connecting multiple cells in series on each phase output line, it is possible to produce a medium-voltage controller with low-voltage power cells. Serial connection of cells makes multiple voltage states per phase possible; these multiple voltage states per phase may be used to obtain improved waveforms.

In the present embodiments, it is preferred to provide a bypass circuit for connecting phase output lines in the event that a power cell fails or becomes disabled. Such a bypass circuit can include a silicon-controlled rectifier which can be gated ON to provide a flow path for load current which may be generated in the phase output line. This bypass circuit can also include a voltage snubbing means for limiting the maximum voltage which may arise across the respective power cell in the phase output line.

It is also preferred to provide a method of controlling the plurality of power cells using a pulse-width modulation technique which selectively controls the duration and frequency of power cell pulse outputs. This method can use control signals, based upon interdigitated carrier signals, to selectively cause a switching event in a particular power cell. It is preferred that switching events be sequenced such that a switching event is occurring in only one power cell at a time.

Other details, objects and advantages of the invention will become apparent as the following description of certain present preferred embodiments proceeds. The accompanying drawings show presently preferred embodiments of the invention, for 2300 volt service. Higher voltages with more series cells are considered an obvious extension.

DESCRIPTION OF PREFERRED EMBODIMENTS

As described herein, a star-type configuration is one in which each phase shares a common node or connection, with every other phase, and may be composed of an arbitrary number of phases. In a three-phase circuit, such a star configuration may be referred to as a WYE connection. A zig-zag transformer may be considered as a special case of a star-configured transformer. In contrast, a mesh-type configuration is one in which two respective phases are connected by a respective impedance, any may be composed of an arbitrary number of phases. In a three-phase circuit, such may be referred to as a DELTA configuration. An extended-delta transformer may be considered as a special case of a mesh-configured transformer. Although the embodiments herein are described in terms of three-phase power circuits, the invention may be applied to other multi-phase circuit configurations, e.g., six phase, as well.

Figure 1:
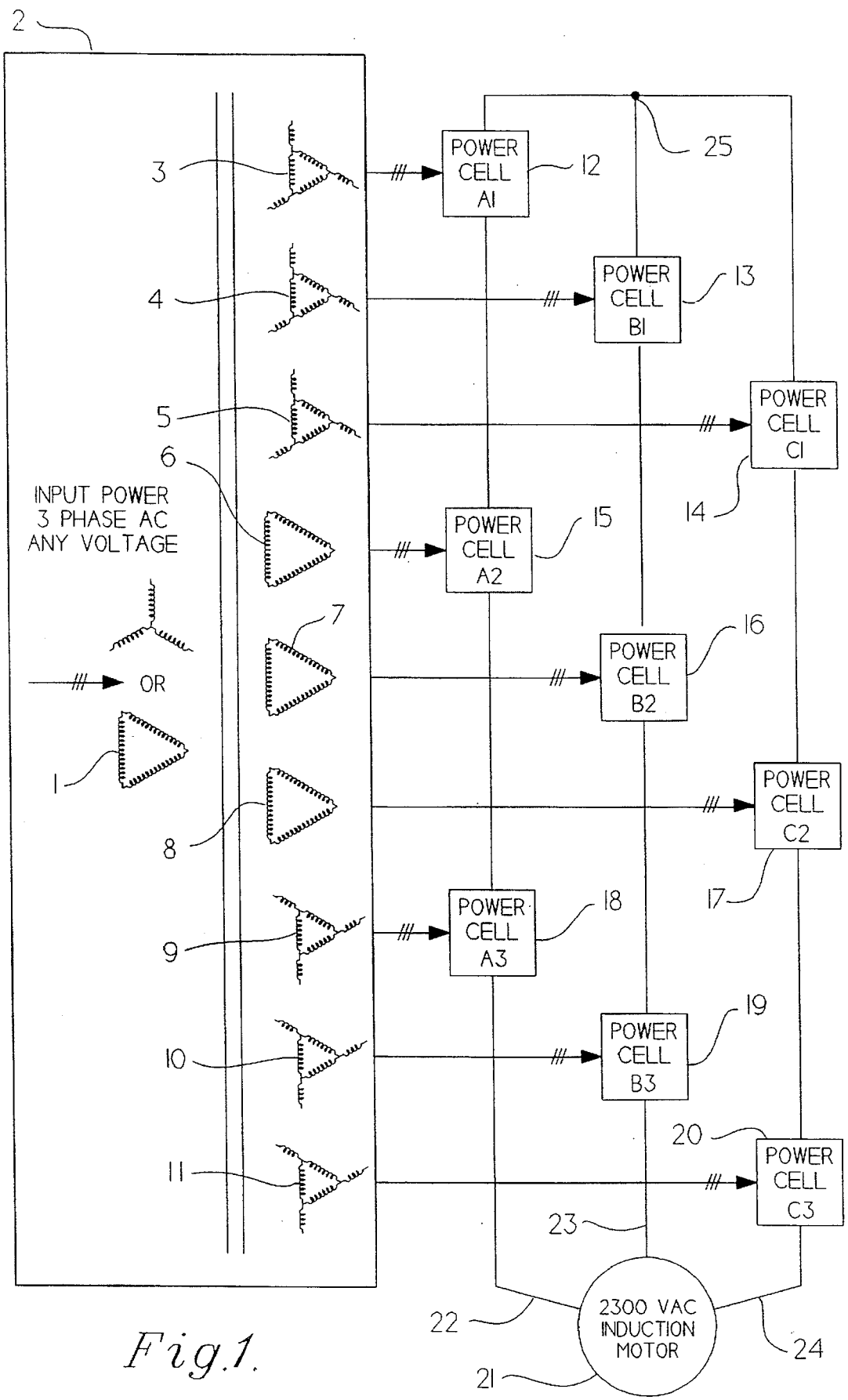
FIG. 1 is a diagram of an embodiment of a medium-voltage pulse-width modulation topology according to the present invention, using mesh-connected secondary windings, configured for a 2300 VAC induction motor load.

As shown in FIG. 1, three-phase AC input power is supplied to primary winding circuit 1 of power supply transformer 2. Primary winding circuit 1, which may be star- or mesh-connected, energizes three-phase secondary winding circuits 3 through 11. The three-phase power associated with each of secondary winding circuits 3 through 11 can be supplied to power cells 12 through 20, respectively. In this present embodiment it is preferred to provide mesh-connected secondary winding circuits 3 through 11 to lower the supply transformer's K-factor and to improve harmonics control. Mesh-connected winding may include, for example, delta or extended delta configurations. Under certain circumstances, such mesh windings may be manipulated to advance some of the secondary windings by preselected degrees of electrical phase, to retard other secondary windings by preselected degrees of electrical phase, and, perhaps, to leave other secondary windings substantially unshifted in phase.

In the present embodiment shown in FIG. 1, it is preferred that one-third of the secondary winding circuits be advanced in phase by 20° and that one-third of the secondary winding circuits be delayed in phase by 20°. The remaining third of the secondary winding circuits remain unshifted. In the embodiment of FIG. 1, the phase-shifted windings use extended-delta-configured windings, and the unshifted windings use delta-configured windings. For other voltages, the respective phase shift needed can be obtained by dividing 60° by the number of cells per phase. For example, with 5 cells per phase, the shifts are +24°, +12°, 0°, −12° and −24°.

It is preferred to connect multiple power cells to each of phase output lines 22, 23, 24, which can represent phase A, Phase B and Phase C, respectively. Multiple cells can be connected in series on each phase output line, making it possible to produce a medium-voltage input phase line controller with a plurality of low-voltage power cells. Serial connections also make multiple voltage states per phase possible; these multiple voltage states per phase may be used to obtain improved current waveforms. Each power cell may be constructed internally to low-voltage standards, for example, each power cell may have a 600-volts rating, despite its inclusion in a medium-voltage apparatus. In such an embodiment, the individual power cells may be isolated from ground, and other power cells, using insulation suitable for the medium voltage level being used.

In FIG. 1, for example, phase output line 22 may be serially connected with power cells 12, 15, 18. Likewise, phase output line 23 may be serially connected with power cells 13, 16, 19. Similarly, phase output line 24 may be serially connected with power cells 14, 17, 20. In the present embodiment, it is preferred that the cells feeding branches 22, 23, 24 are joined by a WYE connection 25 with a floating neutral. Thus configured, power cells 12 through 20 can impress a sufficient medium-voltage line-to-line voltage on motor 21, even though power cells 12 through 20 themselves are constructed internally of components rated to low-voltage standards.

In one presently preferred embodiment, each of secondary winding circuits 3 through 11 provide isolated three-phase power at 460 volts AC (VAC) to power cells 12 through 20, respectively. Accordingly, the smoothing filter inside each cell will be charged to about 600 volts DC (VDC). Thus, the maximum voltage that can be output by each of power cells 12 through 20 is about 600 VDC. Depending on which transistors are on, the output voltage may be of either polarity or zero. Thus, each of power cells 12 through 20 can have three output states: +600 VDC, −600 VDC, or ZERO VDC.

In the present embodiment in FIG. 1, it is preferred to provide three power cells per phase output line. Due to the serial connection between three of the power cells in each phase output line, such as, for example, power cells 12, 15, 18 in phase output line 22, it is possible to produce a maximum output voltage magnitude of about 1800 VDC above neutral. Each power cell may be operated independently of another. Therefore, it is possible to provide at least seven voltage levels per phase to AC motor 21 which, for one presently preferred embodiment, may have a voltage requirement of up to 2300 VAC. The approximate values of those voltage states include +/−1800 VDC, +/−1200 VDC, +/−600 VDC and ZERO VDC.

In other embodiments, circuits using greater or fewer than three power cells per phase may be used to satisfy the voltage requirements of the inductive motor load. For example, in one presently preferred embodiment which can be applied to 2300 VAC inductive motor loads, three power cells are used for each of the three phase output lines. However, in another presently preferred embodiment, which may be applied to a 4160 VAC inductive motor load, five power cells may be used for each of the three phase output lines. Such an embodiment can have eleven (11) voltage states which may include approximately +/−3000 VDC, +/−2400 VDC, +/−1800 VDC, +/−1200 VDC, +/−600 VDC and ZERO VDC.

Figure 2:
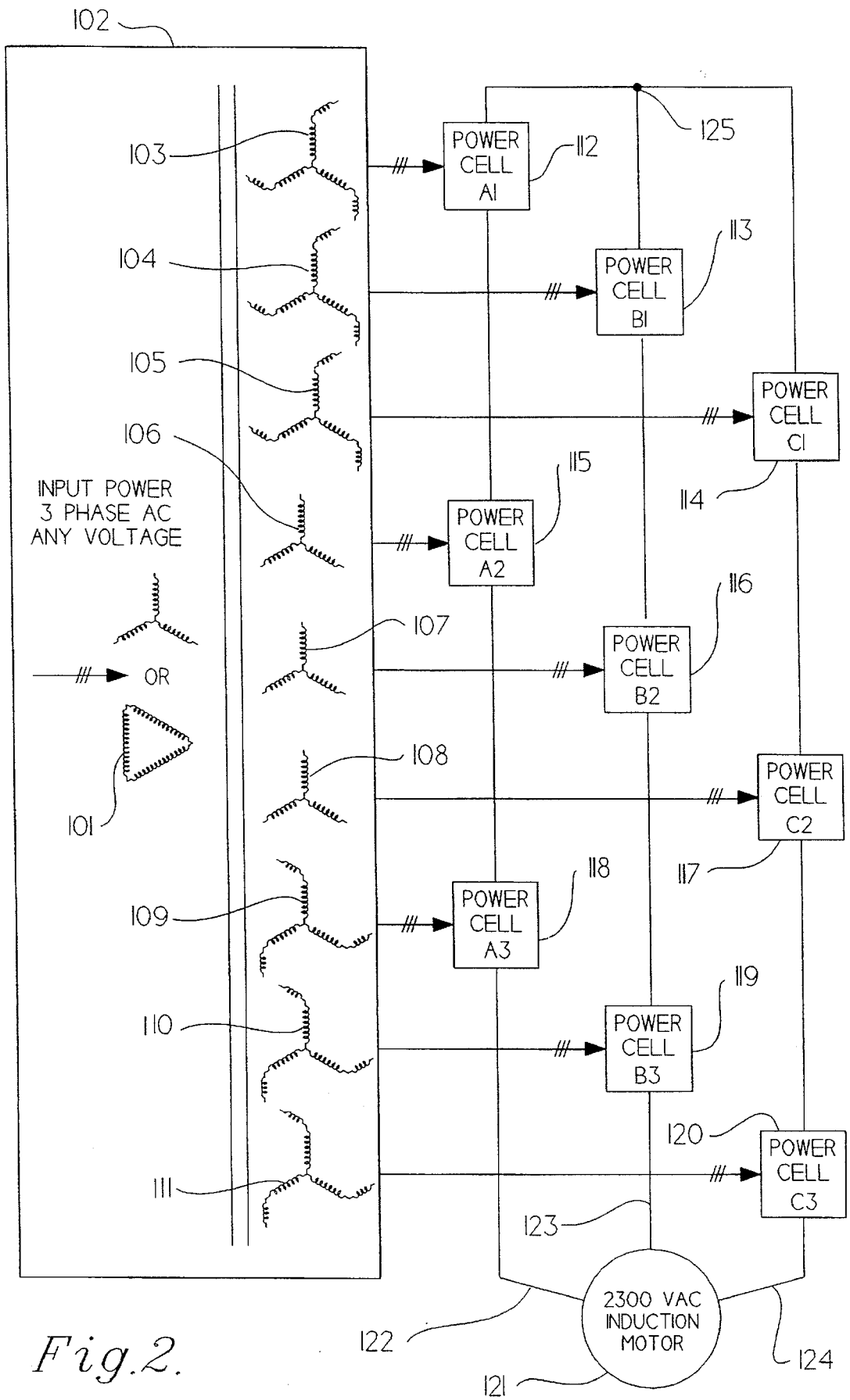
FIG. 2 is a diagram of an embodiment of a medium-voltage pulse-width modulation topology according to the present invention, using star-connected secondary winding circuits, configured for a 2300 VAC induction motor load.

Similar to FIG. 1, three-phase AC input power in FIG. 2 is supplied to primary winding circuit 101 of power supply transformer 102. Primary winding circuit 101, which may be star- or mesh- connected, energizes three-phase secondary winding circuits 103 through 111. The three-phase power associated with each of secondary winding circuits 103 through 111 can be supplied to power cells 112 through 120, respectively. In this present embodiment it is preferred to provide star-connected secondary winding circuits 103 through 111 to lower the supply transformer's K-factor and to improve harmonics control. Star-connected windings may include, for example, WYE or zig-zag configurations. Under certain circumstances, such star windings may be manipulated to advance some of the secondary windings by preselected degrees of electrical phase, to retard other secondary windings by preselected degrees of electrical phase, or, perhaps, to leave other secondary windings substantially unshifted in phase.

In the present embodiment shown in FIG. 2, it is preferred that one-third of the secondary winding circuits be advanced in phase by 20°, and that one-third of the secondary winding circuits be delayed in phase by 20°. The remaining third of the secondary winding circuits remain unshifted. In the embodiment of FIG. 2, the phase-shifted windings use zig-zag-configured windings, and the unshifted windings use wye-configured windings. For other voltages, the respective phase shift needed can be obtained by dividing 60° by the number of cells per phase. For example, with 5 cells per phase, the shifts are +24°, +12°, 0°, −12° and −24°.

As in the configuration of FIG. 1, phase output line 122 in FIG. 2 may be serially connected with power cells 112, 115, 118. Likewise, phase output line 123 may be serially connected with power cells 113, 116, 119. Similarly, phase output line 124 may be serially connected with power cells 114, 117, 120. In the present embodiment, it is preferred that the cells feeding branches 122, 123, 124 are joined by a WYE connection 125 with a floating neutral.

In FIG. 2, each of secondary winding circuits 103 through 111 can provide isolated three-phase power at 460 volts AC (VAC) to power cells 112 through 120, respectively. As in FIG. 1, the maximum voltage that can be output by each of power cells 112 through 120 is about 600 VDC, so each of power cells 112 through 120 can have three output states: +600 VDC, −600 VDC, or ZERO VDC. Also as in the preferred embodiment of FIG. 1, it is preferred to provide three power cells per phase output line. Therefore, the configuration in FIG. 2 can also provide at least seven voltage levels per phase to AC motor 21 which, for one presently preferred embodiment, may have a voltage requirement of up to 2300 VAC. The approximate values of those voltage states include +/−1800 VDC, +/−1200 VDC, +/−600 VDC and ZERO VDC. Circuits using greater or fewer than three power cells per phase also may be used to satisfy the voltage requirements of the inductive motor toad.

Figure 3:
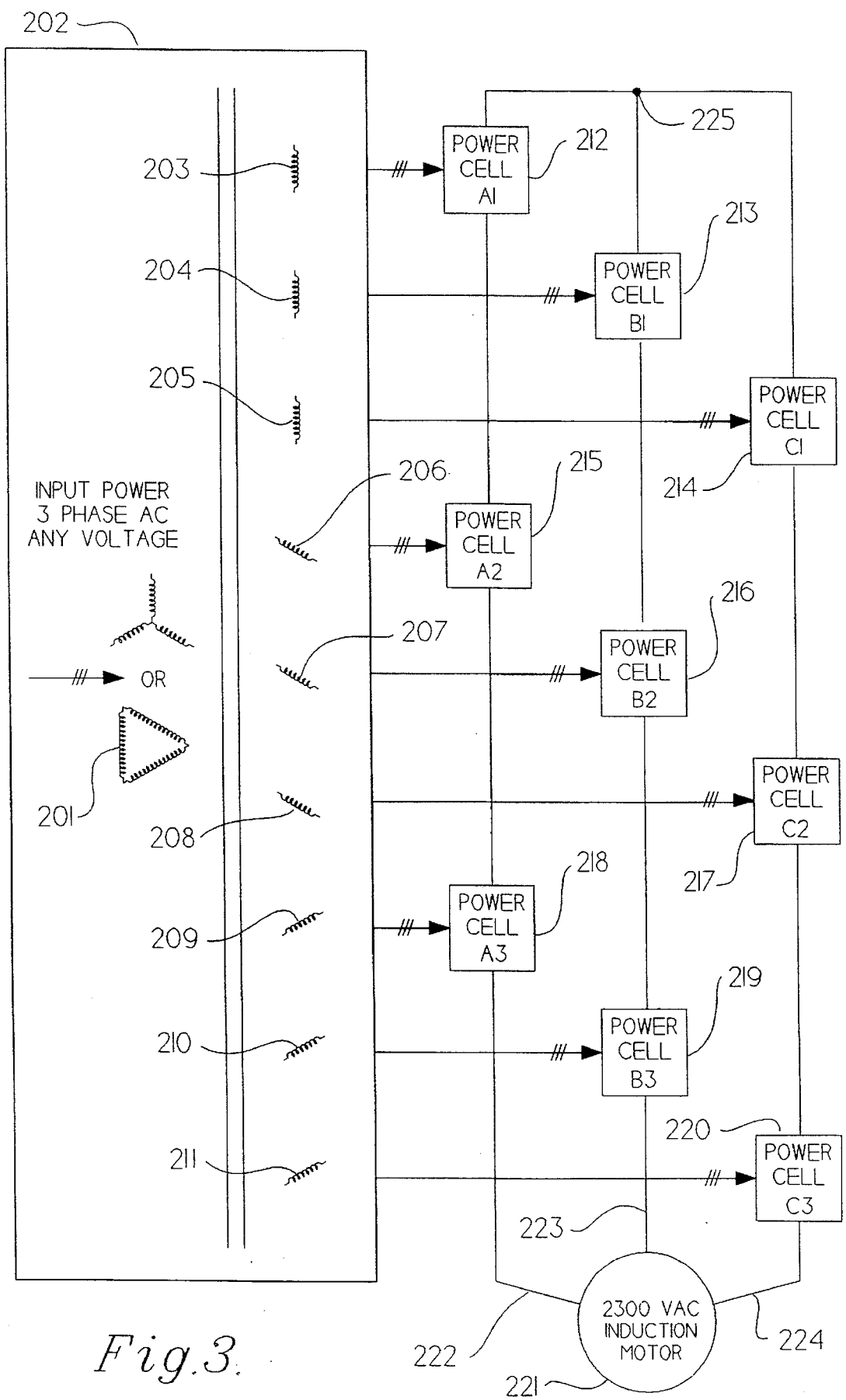
FIG. 3 is a diagram of an embodiment of a medium-voltage pulse-width modulation topology according to the present invention, using single-phase secondary winding circuits, configured for a 2300 VAC induction motor load.

In addition to multi-phase input to power cells, FIG. 3 illustrates that single-phase power may be applied to power cells 212 through 220. However, the topology of power cells 212 through 220 may be different for three-phase input power than it would be for single-phase input power. The different topology may be required because, by modifying a three-phase power cell, similar to FIG. 4, below, excessive harmonic distortion could be produced by cells 212 through 220, which distortion could be reflected back to the power supply 202, producing undesirable effects thereupon. Such harmonics could be reduced or eliminated by conditioning the single-phase input such that the power input in cells 212 through 220 is highly sinusoidal.

Figure 4:
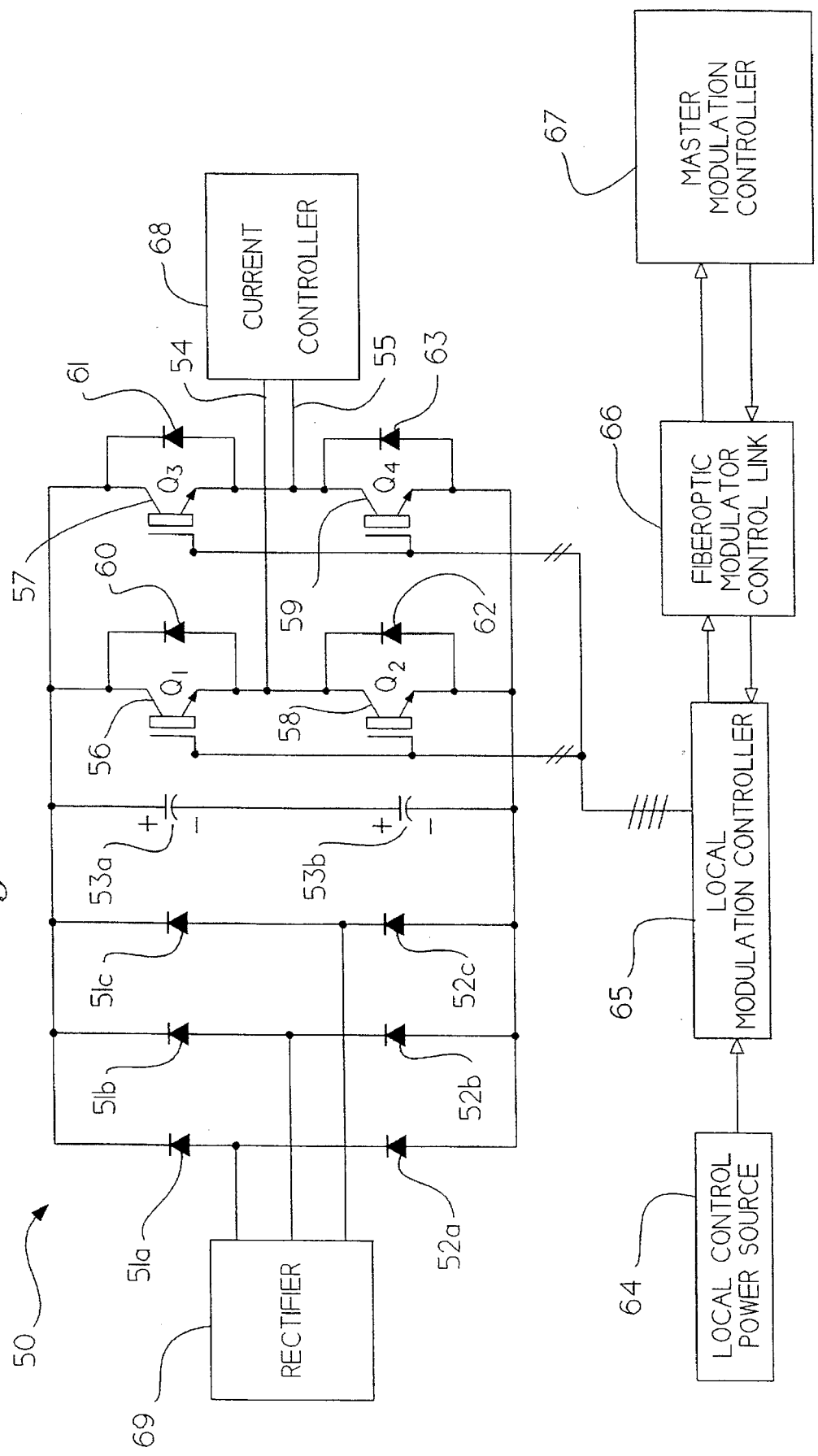
FIG. 4 is a schematic diagram of a power cell according to one presently preferred embodiment of the present invention.

Power cell 50, which is illustrated in FIG. 4, converts three-phase AC power into a filtered DC power output. In the present embodiment it is preferred that rectification be performed by diodes. Rectifying diodes 51a, 51b, 51c, 52a, 52b, 52c are activated by the dedicated three-phase AC secondary winding circuit on the power transformer. One phase may be connected between diodes 51a and 52a; another phase may be connected between diodes 51b and 52b; and the third phase may be connected between diodes 51c and 52c. Together, diodes 51a, 51b, 51c, 52a, 52b, 52c form a bridge rectifier.

Rectification can produce both a DC current and ripple current. Single-phase H-bridge output converters can reflect a ripple current at twice the frequency of motor 21. The DC currents of the rectifier generally will match the DC current of the output converter, but the instantaneous ripple currents generally will not match. It is preferred to provide smoothing capacitors 53a, 53b, which can act as a current smoothing filter, to carry the difference ripple current. Capacitors 53a, 53b are representative of a capacitor bank, the precise values of which may depend upon the power requirements of the inductive load.

The DC power, thus conditioned, can be selectively supplied to output lines 54 and 55 using the PWM method. Pulse-width modulation may be effected using a bridge converter which is composed of semiconductor switches. Such switches are preferred to be power transistors as shown by transistors 56 (Q1), 57 (Q3), 58 (Q2), and 59 (Q4). It is also preferred that transistors 56 through 59 be either fully ON or fully OFF as they operate, and not significantly modulate pulse amplitude.

It can be seen in FIG. 4 that transistors 56 through 59 are connected in a single-phase H-bridge configuration. To form the H-bridge configuration, it is preferred to connect the emitter of transistor 56 (Q1) to the collector of transistor 58 (Q3). Similarly, the emitter of transistor 57 (Q4) is connected to the collector of transistor 59 (Q4). Transistor pairs 56, 58, i.e., Q1 and Q2, and 57, 59, i.e., Q3 and Q4, are each connected to the DC power supply with the collectors of transistors 56 (Q1), 57 (Q3) being connected to the positive side and the emitters of transistors 58 (Q2), 59 (Q4) being connected to the negative side.

Overvoltage protection of each of transistors 56 through 59 may be accomplished by use of anti-parallel diodes 60 through 63. In such an arrangement, the cathode of diodes 60 through 63 is connected to the collector of transistors 56 through 59, respectively, and the anodes of diodes 60 through 63 is connected to the emitters of transistors 56 through 59, respectively. Transistors 56 through 59 are preferred to be power transistors, such as for example, bipolar transistors or insulated gate bipolar transistors (IGBTs). Often such transistors include the anti-parallel diodes in one package.

Power, in the form of pulse-width-modulated pulses, is delivered to a first phase output line segment 54 by a connection between the emitter of transistor 56 (Q1) and the collector of transistor 58 (Q2). Likewise, power is delivered to a second phase output line segment 55 by a connection between the emitter of transistor 57 (Q3) and the collector of transistor 59 (Q4).

Transistors 56 through 59 can receive controlling signals from local modulation controller 65 through suitable isolation means. Such controller 65 may be typified by Fuji part number EXP841, although other gating controllers may be used. Isolation may be provided by fiber-optic means. Controller 65 selects either of transistor 56 (Q1) or 58 (Q2) to be ON, and either of transistor 57 (Q3) or 59 (Q4) to be ON, which will permit power to pass to a load 68 by way of the first phase output line segment 54 or the second phase output line segment 55, respectively. Fiber-optic modulator control links 66 can be used to electrically isolate all circuits in any one cell from all circuits in any other cell, and to reduce electromagnetic interference effects which may be imposed between local controller 65 and master modulation controller 67. Local modulation controller 65 can receive power from local control power source 64 which may be electrically connected to secondary winding circuit input 69.

As heretofore mentioned regarding this presently preferred embodiment, each cell may have only three possible output voltages at any instant in time. For example, if transistors 56 (Q1) and 59 (Q4) are ON, the output can be +600 volts between first and second phase output line segments 54 and 55, respectively. If transistors 58 (Q2) and 57 (Q3) are ON, the output between line portions 54 and 55 can be −600 volts. Finally, if either transistors 56 (Q1) and 57 (Q3), or 58 (Q2) and 59 (Q4) are ON, the output between line segments 54 and 55 can be ZERO volts.

The embodiments herein employ voltage-source topology, where the combination of power cells 50 determine the phase voltage, but the load determines the current. Accordingly, it is preferred to provide a current path at all times between phase output line segments 54 and 55 because (1) other cells in series with cell 50 may be producing a non-zero voltage across output line segments 54 and 55 when cell 50 is at ZERO volts, and (2) inductive loads demand a continuous path for current flow. Therefore, the method for controlling the operational state of power cell 50 includes controlling the semiconductor switches, here transistors 56 through 59, such that each power cell 50 conducts current at a predetermined voltage, with a predetermined polarity, and for a predetermined pulse duration.

At the present time, very few power semiconductor switching devices are available with sufficient voltage rating to build simple converters operating directly at medium voltage. Those devices that are available can only be obtained at large current ratings, are relatively slow in switching speed, and are very expensive. By contrast, many different devices are available for low voltage service, including low current ratings and fast types. These parts are used in high volume for low voltage converters and are therefore inexpensive.

Figure 5:
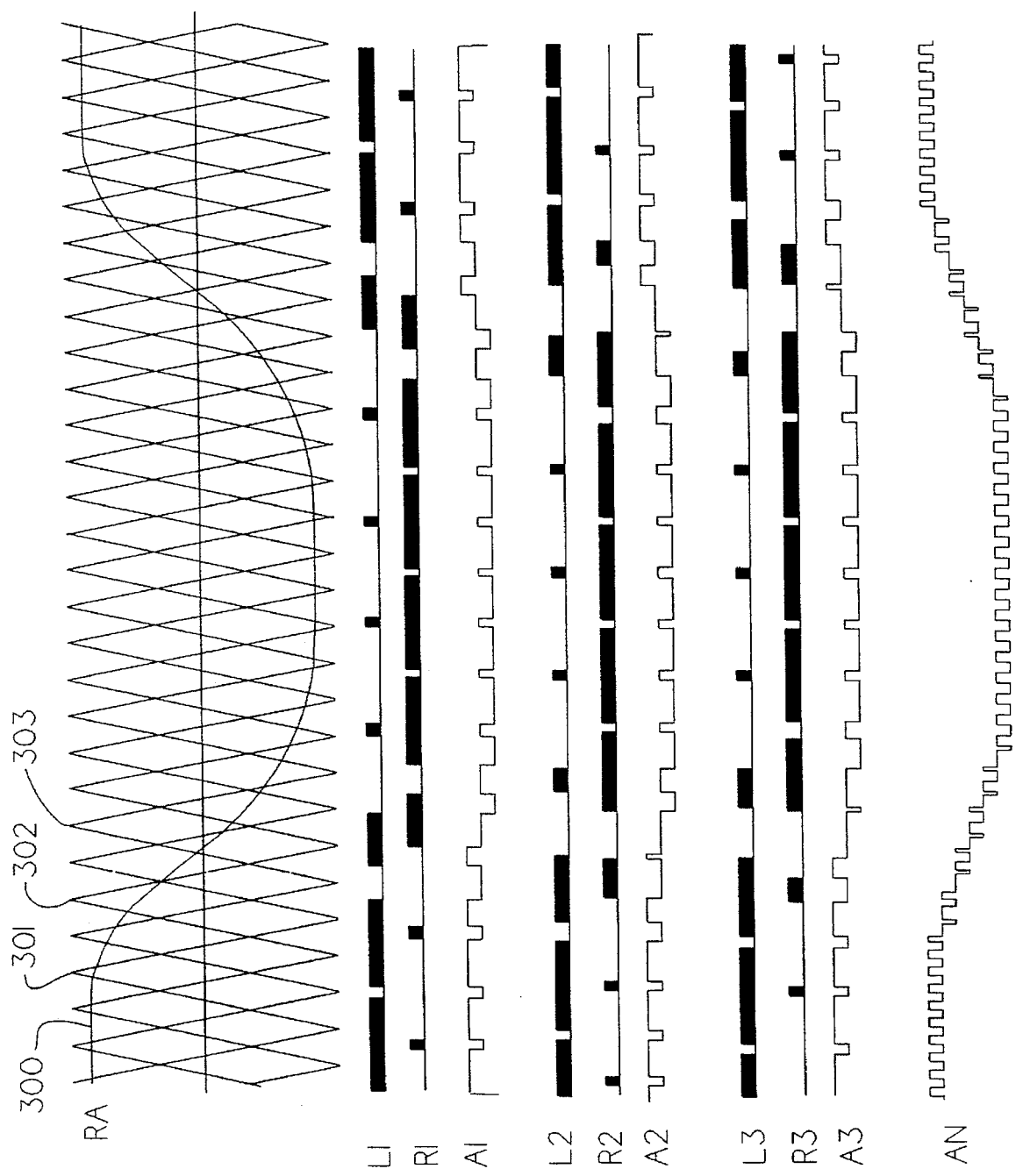
FIG. 5 is an illustration of control, and reference voltage waveforms which may be used to produce a line-to-neutral voltage for a particular output phase.

FIG. 5 shows one possible way of controlling the proposed drive, based on the "Subharmonic Method". A reference signal is generated for each phase. In FIG. 5, RA, 300, is the reference signal for Phase A. RA, 300, is compared with three triangular carrier signals, 301, 302, 303, oscillating at the switching frequency. For clarity, FIG. 5 shows only 10 carrier cycles per reference cycle, as if the drive were operating at 60 Hz while modulating at 600 Hz. Other reference and carrier frequencies could be used. For example, in the present embodiment, it preferred that the number of carriers used be equal to the number of power cells per phase output line. Carriers 301, 302, 303, are identical except for successive phase shifts of 120 degrees, based on the carrier frequency.

Whenever RA, 300, is greater than unshifted carrier 301, the signal L1 is high; otherwise L1 is low. L1 is used to control left-hand pair of transistors in cell A1. Whenever RA, 300, is greater than the inverse of carrier 301, signal R1 is high; otherwise R1 is low. R1 is used to control the right-hand pair of transistors in cell A1. The difference between L1 and R1 gives the output waveform of cell A1, shown in FIG. 5, as A1. In a similar manner, reference signal RA, 300, is compared with carrier 302, shifted 120° and its inverse to generate control signals L2 and R2 for the transistors in cell A2. The output waveform of cell A2 is shown as A2. Finally, RA, 300, is compared with carrier 303, shifted 240°, and its inverse, to generate control signals L3 and R3 for the transistors in cell A3. The output waveform of cell A3 is shown as A3. The sum of the output voltages from cells A1, A2 and A3 can produce the A-to-neutral voltage of the drive, shown in FIG. 5 as AN. Note that this voltage is defined between terminal A and the floating neutral inside the drive, not the motor neutral.

Figure 6:
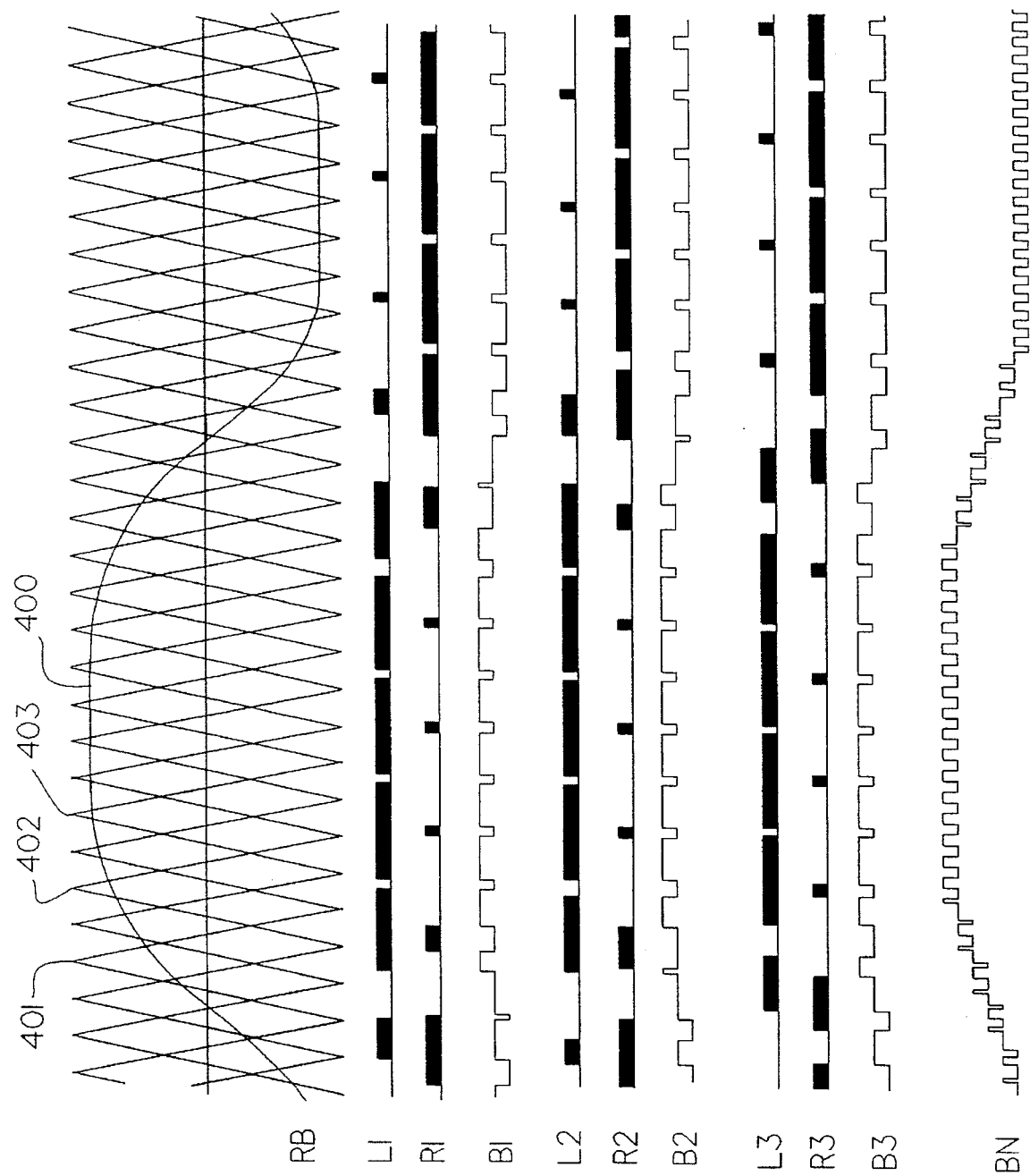
FIG. 6 is an illustration of control, and reference voltage waveforms which may be used to produce a line-to-neutral voltage for another particular output phase.

FIG. 6 shows the same signals for Phase B. The three carriers 401, 402, 403, are identical to FIG. 5. Reference RB 400 is also identical to FIG. 4, except that it is displaced by 120°, at the reference frequency. The sum of the output voltages from cells B1, B2 and B3 can produce the B-to-neutral output voltage of the drive, shown in FIG. 5 as BN. This voltage is also defined between terminal B and the floating neutral inside the drive, not the motor neutral.

In both FIGS. 5 and 6, the line-to-neutral voltages, AN and BN, respectively, are formed by summing the output of several cells. The line-to-neutral voltages clearly contain more pulses than do the outputs of the individual cells. By using separate carriers to create control signals for individual cells, the instants during which cell switching events occur can be controlled. Cell switching events can be temporally separate, i.e., dispersed in time, using pulse interdigitation, to avoid simultaneous switching events by more than one cell. Pulse interdigitation causes the apparent switching frequency delivered to the load to be higher than the actual switching frequency of the cells. The result of so controlling cell switching is that the harmonics that otherwise appear in the power spectrum tend to be attenuated or cancelled, and are not reflected back out of the cell.

Figure 7:
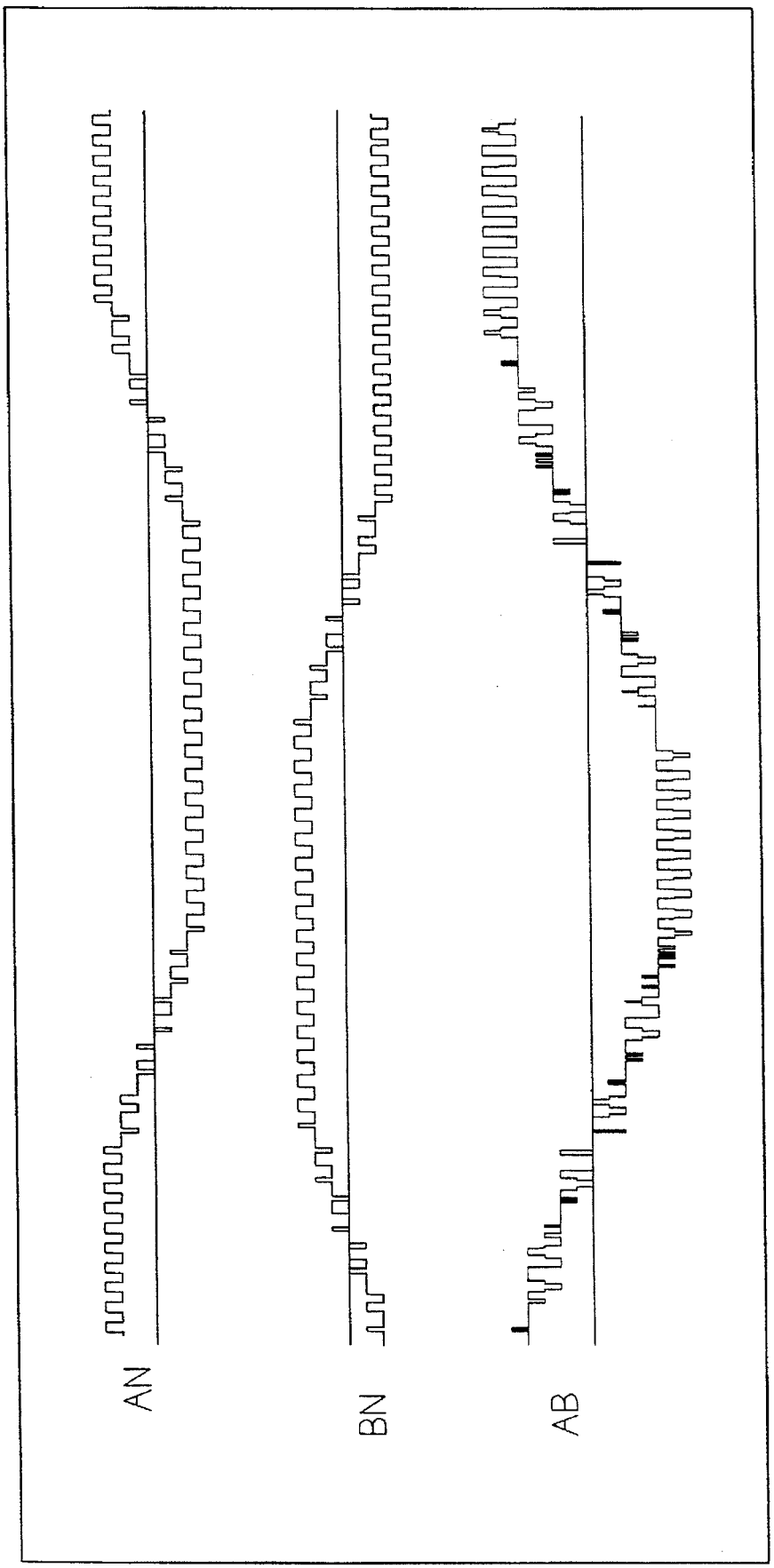
FIG. 7 is an illustration of the line-to-neutral voltage waveforms from FIGS. 3 and FIGS. 4, and the resultant line-to-line voltage waveform which may result from the potential difference between the phase line voltage illustrated in FIG. 4 and the phase line voltage in FIG. 4.

FIG. 7 shows the two line-to-neutral voltage waveforms of earlier figures, as well as a resultant line-to-line voltage. In particular, voltage waveform AN in this figure corresponds to voltage waveform AN in FIG. 5; and voltage waveform BN in this figure corresponds to voltage waveform BN of FIG. 6. The difference in potential between AN and BN results in voltage waveform AB, which is impressed upon the load.

Figure 8:
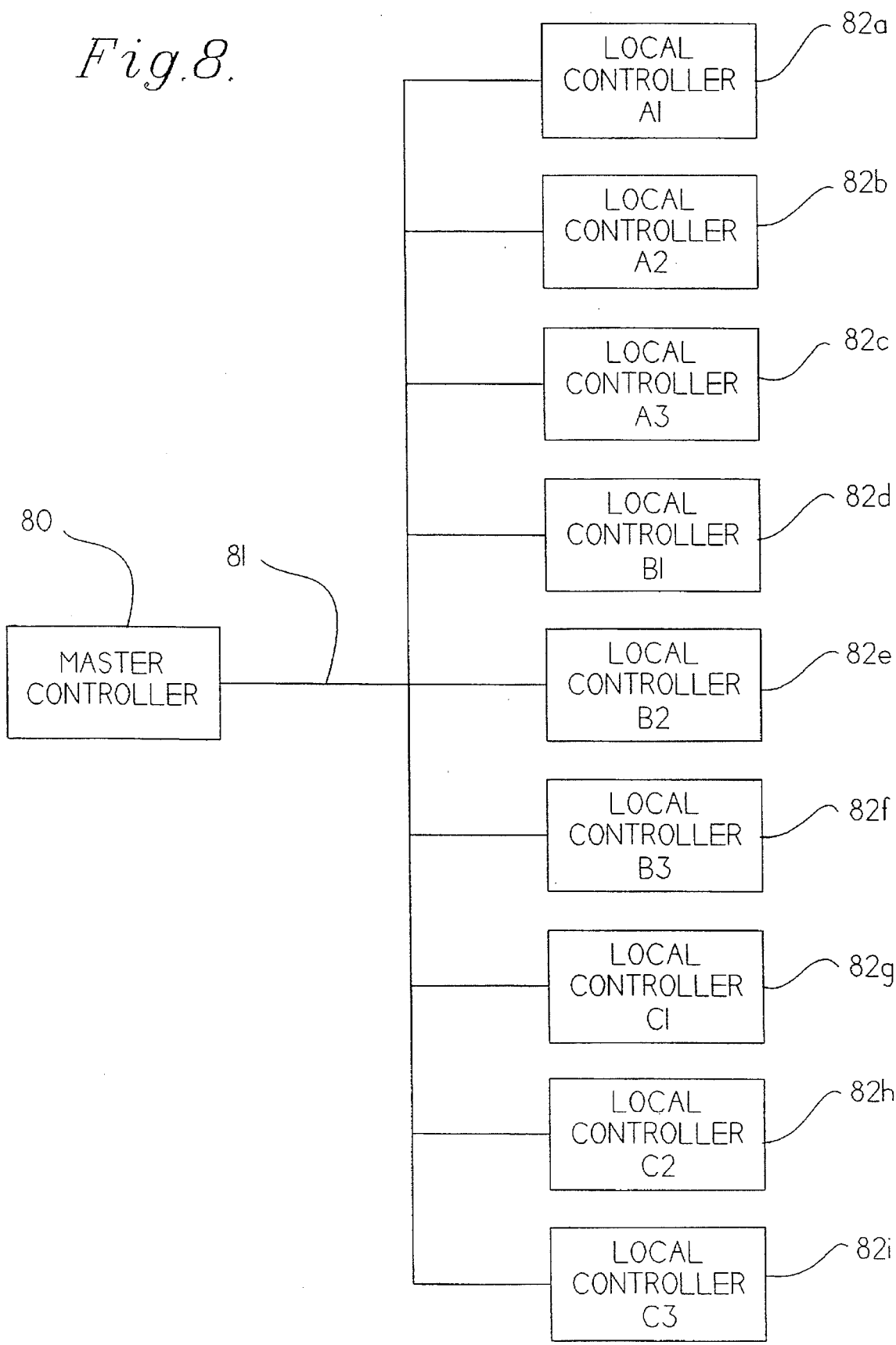
FIG. 8 is a diagram showing a modulation control scheme using fiber-optic links according to the present invention.

In FIG. 8, master modulation controller 80 can be seen to transmit modulation control signals to and accept control information from local modulation controllers 82a through 82i. As shown in FIG. 4, where local controller 65 may be like one of controllers 82a through 82i of FIG. 8, and master controller 67 of FIG. 4 can be like master controller 80 of FIG. 8, control signals can be bisectionally transmitted by way of fiber-optic modulator control links 81. Links 81 in FIG. 8 may be like link 66 in FIG. 4.

Figure 9:
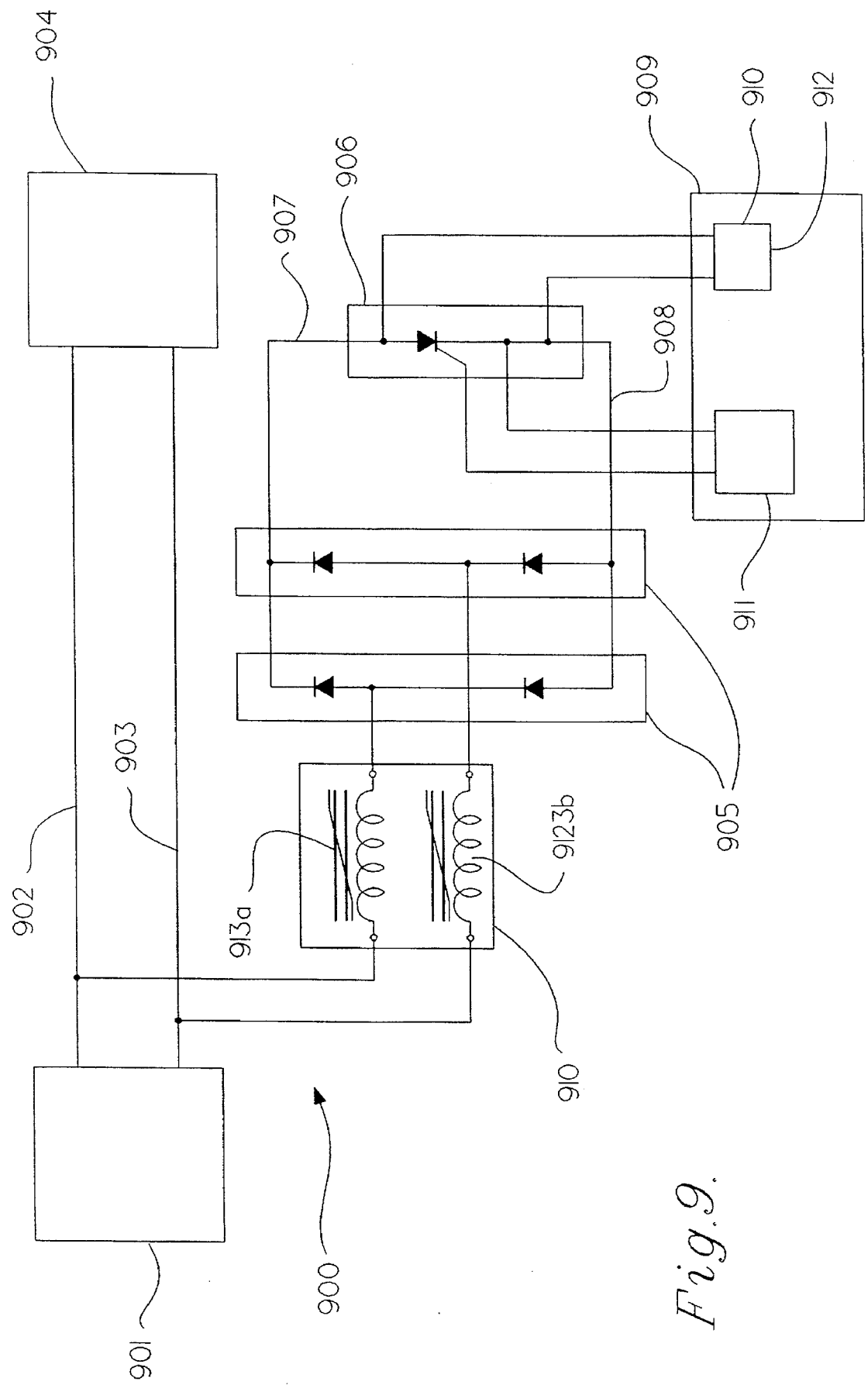
FIG. 9 is a diagram of a bypass circuit for maintaining a load current path within a disabled power cell.

In some present embodiments, it may be preferred to provide a bypass circuit for connecting segments of a phase output line, within the same phase, in the event that power cell 901 fails or becomes disabled, as is illustrated in FIG. 9. In one present embodiment, it is preferred to provide bypass circuit 900, connected between phase output line segments 902, 903 from power cell 901, for passing a current from load 904 between phase output line segments 902, 903. Bypass circuit 900 may contain diode bridge 905 connected between phase output line segments 902, 903 which is, in turn, connected with bypass gating means 906, by gating control input line 907 and gating control output line 908. Bypass gating means 906 can provide a current path for load current which bypasses power cell 901. It Is also preferred to provide bypass means 909 for selectively permitting the current of load 904 to pass through bypass circuit 900.

In present embodiments, it is preferred that bypass gating means 906 be a silicon-controlled rectifier, although other semiconductor gating devices including, for example, MOS-controlled thyristors, may be used. Also, it is preferred that bypass means 909 include voltage snubbing means 910 for limiting a maximum voltage between output line segments 902, 903, and gate firing means 911 for selectively controlling the operation of bypass gating means 906. Further, it is preferred that voltage snubbing means 910 include voltage snubbing control circuit 912, and inductors 913a and 913b to assist voltage snubbing means 910 in limiting the maximum voltage impressed across phase output line segments 902, 903 when bypass gating means 906 is gated OFF. Because the impedance presented by inductors 913a, 913b may not necessary when load current is flowing through bypass gating means 906, the inductors may be chosen such that their inductances saturate at a predetermined level. In order to facilitate load balancing, bypass circuit 900 of a respective power cell in a respective phase output line may cooperate with bypass circuit 900 of other respective power cells in other respective phase output lines to limit the voltage impressed on the other respective phase output lines.

EXAMPLE

Figure 10:
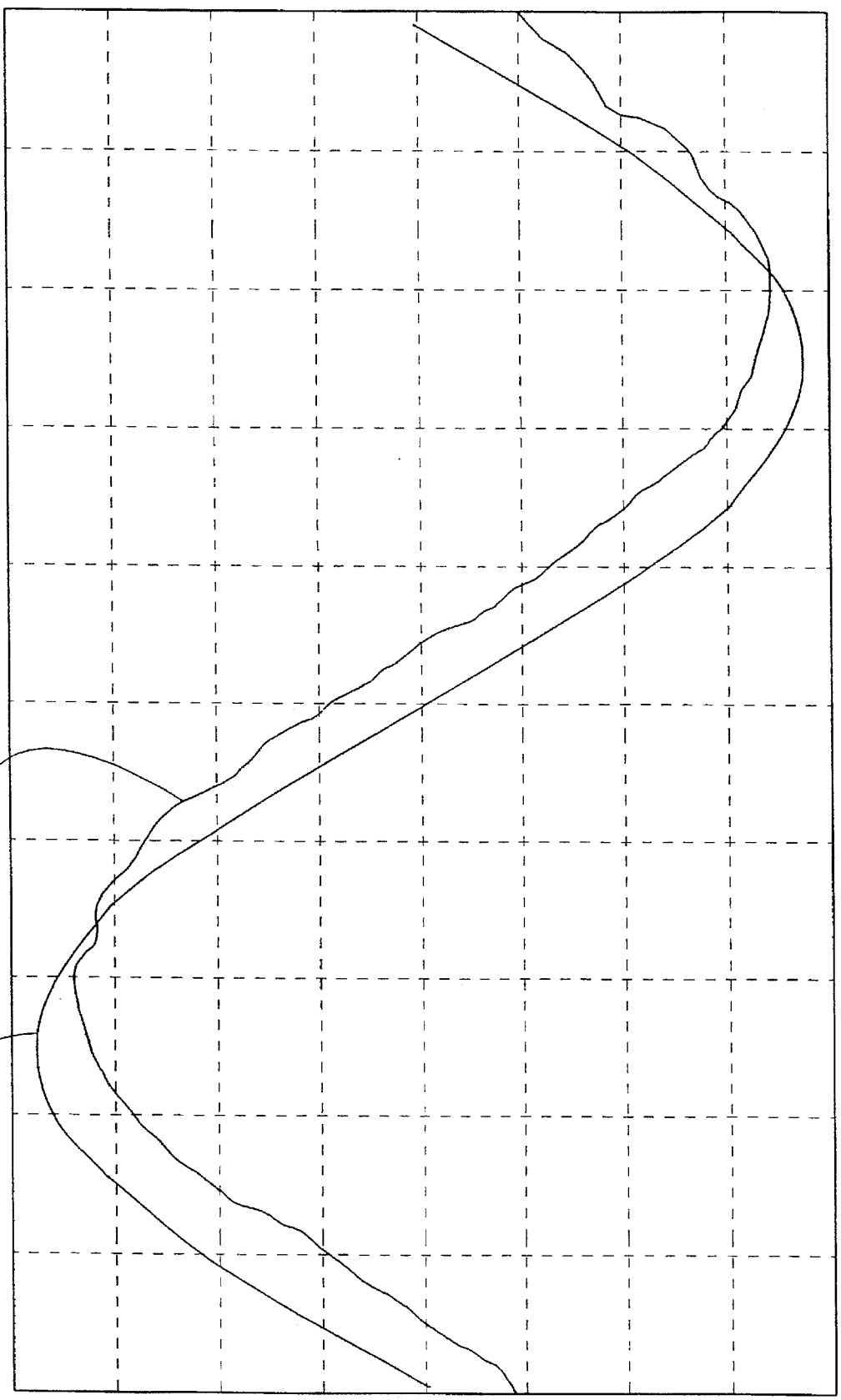
FIG. 10 is an illustration of simulated voltage and current waveforms as would be measured at the power supply transformer input.
Figure 11:
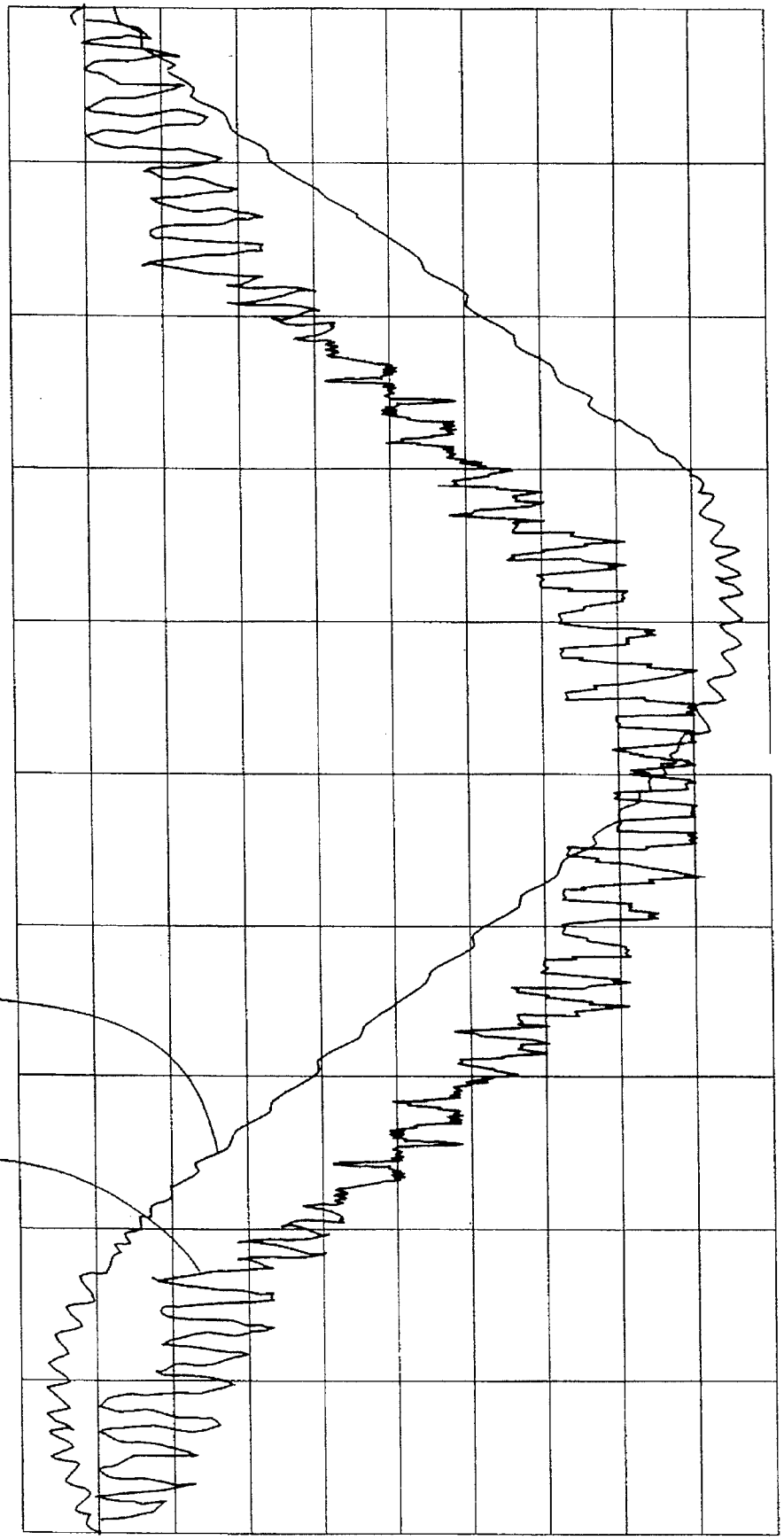
FIG. 11 is an illustration of simulated voltage and current waveforms as would be measured in one phase line into an induction motor driven by the invention disclosed herein.

To appreciate the benefits provided by the invention herein, a simulation was performed for a 2300 VAC, 60 Hz, 1000 horsepower induction motor operating at full speed and under a full load. FIG. 10 and 11 illustrate both voltage and current waveforms at the primary winding circuit of the power supply transformer and at the motor, respectively.

In FIG. 10, the input voltage waveform 500 is a calculated input between phase A and neutral of a WYE-connected primary winding circuit of a three-phase power supply. Input current waveform 501 is a calculated current input to phase A. Each horizontal division represents approximately 1.67 milliseconds, each vertical division represents 600 VAC for voltage and 500 amperes for current. Due to the harmonic cancellation within the power cells, and due to the phase-shifted secondary windings of the power supply transformer, total harmonic distortion (THD) of the input current is greatly reduced. In this simulation, THD was less than 5 percent. In addition, input current lags input voltage by less than 15 degrees at full load, giving a power factor in excess of 96 percent.

In FIG. 11, the motor voltage waveform 550 is a calculated input to an induction motor, with the aforementioned characteristics, between phase A and motor neutral. Motor current waveform 551 represents the current supplied to the motor in phase A during full-load operation. Each horizontal division represents approximately 1.67 milliseconds, each vertical division represents 500 VAC for voltage and 80 amperes for current. Typically, THD of motor currents is less than 5 percent.

While specific embodiments oil, and methods for practicing, the invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the invention which is to be given the full breadth of the following claims and any and all embodiments thereof.

I claim:

1. An electric drive for use with a multi-phase AC load comprising:
    (a) a multi-phase power transformer, said power transformer having at least one primary winding circuit and a plurality of secondary winding circuits, said primary winding circuit being electrically connectable to a source of multi-phase AC power;
    (b) a plurality of power cells, each of said plurality of power cells having an input connected with a respective one of said plurality of secondary winding circuits, each of said plurality of power cells having a single-phase controllable output to such multi-phase AC load, and said plurality of power cells being serially connected with respective others of said power cells in each phase output line to such multi-phase AC load;
    (c) modulation control means connected to respective ones of said plurality of power cells, so that the output of said respective ones of said plurality of power cells is controlled;
    (d) said plurality of power cells each having a rectifier electrically connected to a respective one of said plurality of secondary winding circuits and having an electrical output;
    (e) said plurality of power cells includes a pre-selected number of power cells in series in each phase output line and said plurality of secondary winding circuits are spaced apart in electrical phase by a number of degrees equal to 60 divided by said pre-selected number thereby reducing harmonics in lines to said source; and
    (f) said modulation control means further having means for selectively controlling a switching event of each of said plurality of power cells so that said switching event of respective one of said plurality of power cells in each phase output line is spaced in time from said switching event of respective others of said plurality of power cells in the respective phase output line thereby reducing harmonic components in such output lines to such load.

2. The electric drive of claim 1 wherein each of said plurality of power cells further comprises:
   (a) a smoothing filter connected to said output of said rectifier; and
   (b) a converter connected to said smoothing filter, and the output of said converter connected to respective one of said phase output lines to such multi-phase load.

3. The electric drive of claim 2 wherein said rectifier includes a diode bridge, and said smoothing filter includes capacitors.

4. The electric drive of claim 2 wherein said converter further comprises plurality of semiconductor switches, each of said plurality of semiconductor switches operably connected to said rectifier and said smoothing filter, selected ones of said plurality of semiconductor switches being connected to selected others of said plurality of semiconductor switches in an H-bridge configuration, and each of said plurality of semiconductor switches being connected to said control circuit.

5. The electric drive of claim 4 wherein said semiconductor switches are power transistors.

6. The electric drive of claim 1 wherein selected ones of said plurality of power cells are connected by a common star with floating neutral connection.

7. The electric drive of claim 1 wherein the maximum output voltage of each of said plurality of power cells is less than the maximum line-to-line voltage for such multi-phase AC load.

8. The electric drive of claim 1 wherein said plurality of secondary winding circuits are star-connected.

9. The electric drive of claim 8 wherein at least three of said plurality of secondary winding circuits are wye windings.

10. The electric drive of claim 8 wherein at least three of said plurality of secondary winding circuits are zig-zag windings.

11. The electric drive of claim 1 wherein said plurality of secondary winding circuits are mesh-connected.

12. The electric drive of claim 11 wherein at least three of said plurality of secondary winding circuits are delta windings.

13. The electric drive of claim 11 wherein at least three of said plurality of secondary winding circuits are extended delta windings.

14. The electric drive of claim 1 wherein said modulation control means further comprises:
   (a) a plurality of local modulator controllers connected to respective ones of said plurality of power cells; and
   (b) a master modulator controller operably connected to each of said plurality of local modulator controllers.

15. The electric drive of claim 14 wherein said master modulator controller is operably connected to said plurality of local modulator controllers with fiber-optic means.

16. The electric drive of claim 1 further comprising a bypass circuit connected between a first phase output line segment and a second phase output line segment for selectively bypassing at least one of said plurality of power cells.

17. The electric drive of claim 1 wherein said modulation control means further comprises:
   a. means for selectively applying at least one control signal to said plurality of power cells so that each of said plurality of said power cells conducts a current at a predetermined voltage, with a predetermined polarity, and for a predetermined duration; and
   b. means for interdigitating a preselected number of carrier signals to each of said plurality of said power cells, so that harmonic components in a power frequency spectrum are generally attenuated.

18. The electric drive of claim 1 wherein said pre-selected number of said plurality of power cells in each phase output line is three, first selected ones of said plurality of secondary winding circuits are advanced in phase by generally 20 degrees from second selected ones of said plurality of secondary winding circuits, and third selected others of said plurality of secondary winding circuits are delayed in phase by generally 20 degrees from second selected ones of said plurality of secondary winding circuits.

19. The electric drive of claim 1 wherein said preselected number of said plurality of power cells in each phase output line is four, and each of said pre-selected number of said plurality of power cells is phase-shifted by generally 15 degrees from respective others of said pre-selected number of said plurality of power cells.

20. The electric drive of claim 1 wherein said pre-selected number of said plurality of power cells in each phase output line is five, first selected ones of said plurality of secondary winding circuits are advanced in phase by generally 24 degrees from second selected ones of said plurality of secondary winding circuits, third selected ones of said plurality of secondary winding circuits are advanced in phase by generally 12 degrees from second selected ones of said plurality of secondary winding circuits, fourth selected ones of said plurality of secondary winding circuits are delayed in phase by generally 12 degrees from second selected ones of said plurality of secondary winding circuits, and fifth selected ones of said plurality of secondary winding circuits are delayed in phase by generally 24 degrees from second selected ones of said plurality of secondary winding circuits.

21. An electric drive for use with a multi-phase AC load comprising:
   (a) a multi-phase power transformer, said power transformer having at least one primary winding circuit and a plurality of secondary winding circuits, said primary winding circuit being electrically connectable to a source of multi-phase AC power;
   (b) a plurality of power cells, each of said plurality of power cells having an input connected with a respective one of said plurality of secondary winding circuits, each of said plurality of power cells having a single-phase controllable output to such multi-phase AC load, and said plurality of power cells being serially connected with respective others of said power cells in each phase output line to such multi-phase AC load;
   (c) modulation control means connected to respective ones of said plurality of power cells, so that the output of said respective ones of said plurality of power cells is controlled; and
   (d) said modulation control means further comprises means for selectively controlling a switching event of each of said plurality of power cells so that said switching event of respective one of said plurality of power cells in each phase output line is spaced in time from said switching event of respective others of said plurality of power cells in the respective phase output line thereby reducing harmonic components in such output lines to such load.

22. The electric drive of claim 21 wherein said plurality of power cells includes a pre-selected number of power cells in series in each phase output line, and said plurality of secondary winding circuits are spaced apart in electrical phase by a number of degrees equal to 60 divided by said pre-selected number.

23. An electric drive for use with a multi-phase AC load comprising:
 (a) a multi-phase power transformer, said power transformer having at least one primary winding circuit and a plurality of secondary winding circuits, said primary winding circuit being electrically connectable to a source of multi-phase AC power;
 (b) a plurality of power cells, each of said plurality of power cells having an input connected with a respective one of said plurality of secondary winding circuits, each of said plurality of power cells having a single-phase controllable output to such multi-phase AC load, and said plurality of power cells being serially connected with respective others of said power cells in each phase output line to such multi-phase AC load;
 (c) modulation control means connected to respective ones of said plurality of power cells, so that the output of said respective ones of said plurality of power cells is controlled;
 (d) a bypass circuit connected between a first phase output line segment and a second phase output line segment for selecting bypassing at least one of said plurality of power cells;
 said bypass circuit further having;
  (i) a diode bridge connected between said first phase output line segment and said second phase output line, and said diode bridge having a gating control input line and a gating control output line;
  (ii) bypass gating means, connected between said gating control input line and said gating control output line, for selectively providing a current path for said load current through said diode bridge;
  (iii) voltage snubbing means for limiting a maximum voltage between said first phase output line segment and said second phase output line segment; and
  (iv) bypass means for selectively permitting said load current to pass through said bypass circuit.

24. The electric drive of claim 23 wherein
 said gating means includes at least one semiconductor gating device,
 said bypass control means includes gate firing means and voltage snubbing means, and
 said voltage snubbing means includes a voltage snubbing circuit and at least one inductor of a preselected impedance.

25. An electric drive for use with a multi-phase AC load comprising:
 (a) a multi-phase power transformer, said power transformer having at least one primary winding circuit and a plurality of secondary winding circuits, said primary winding circuit being electrically connectable to a source of multi-phase AC power;
 (b) a plurality of power cells, each of said plurality of power cells having an input connected with a respective one of said plurality of secondary winding circuits, each of said plurality of power cells having a single-phase controllable output to such multi-phase AC load, and respective ones of said plurality of power cells being serially connected with respective others of said plurality of power cells in each phase output line to such multi-phase AC load;
 (c) each of said plurality of power cells having
  i. a rectifier electrically connected to a respective one of said plurality of secondary winding circuits and having an electrical output,
  ii. a smoothing filter connected to said output of said rectifier,
  iii. a converter connected to said smoothing filter, and the output of said converter connected to respective one of said phase output lines of such multi-phase load;
 (d) modulation control means connected to each of said converter, so that the output of said converter is controlled, said control means having
  i. a plurality of local modulator controllers connected to respective ones of said plurality of power cells,
  ii. a master modulator controller operably connected to each of said plurality of local modulator controllers, and
  iii. means for selectively controlling a switching event of each of said plurality of power cells so that said switching event of respective one of said plurality of power cells in each phase output line is spaced in time from said switching event of respective others of said plurality of power cells in the respective phase output line thereby reducing harmonic components in such output lines to such load.

26. The electric drive of claim 25 wherein selected ones of said plurality of power cells are connected by a common star with floating neutral connection.

27. The electric drive of claim 25 wherein the maximum output voltage of each of said plurality of power cells is less than the maximum line-to-line voltage for such multi-phase AC load.

28. The electric drive of claim 25 wherein said plurality of secondary winding circuits are star-connected.

29. The electric drive of claim 28 wherein at least three of said plurality of secondary winding circuits are wye windings.

30. The electric drive of claim 28 wherein at least three of said plurality of secondary winding circuits are zig-zag windings.

31. The electric drive of claim 25 wherein at least three of said plurality of secondary winding circuits are mesh-connected.

32. The electric drive of claim 31 wherein at least three of said plurality of secondary winding circuits are delta windings.

33. The electric drive of claim 31 wherein at least three of said plurality of secondary winding circuits are extended delta windings.

34. The electric drive of claim 25 wherein said master modulator controller is operably connected to said plurality of local modulator controllers with fiber-optic means.

35. The electric drive of claim 25 wherein said plurality of power cells includes a pre-selected number of power cells in series in each phase output line, and said plurality of secondary winding circuits are spaced apart in electrical phase by a number of degrees equal to 60 divided by said pre-selected number.

36. The electric drive of claim 35 wherein said pre-selected number of said plurality of power cells in each phase output line is three, first selected ones of said plurality of secondary winding circuits are advanced in phase by generally 20 degrees from selected ones of said plurality of secondary winding circuits, and third selected others of said plurality of secondary winding circuits are delayed in phase by generally 20 degrees from second selected ones of said plurality of secondary winding circuits.

37. The electric drive of claim 35 wherein said preselected number of said plurality of power cells in each phase output line is four, and each of said pre-selected number of said plurality of power cells is electrically phase-shifted by generally 15 degrees from respective others of said pre-selected number of said plurality of power cells.

38. The electric drive of claim 35 wherein said preselected number of said plurality of power cells in each phase output line is five, first selected ones of said plurality of secondary winding circuits are advanced in phase by generally 24 degrees from second selected ones of said plurality of secondary winding circuits, third selected ones of said plurality of secondary winding circuits are advanced in phase by generally 12 degrees from second selected ones of said plurality of secondary winding circuits, fourth selected ones of said plurality of secondary winding circuits are delayed in phase by generally 12 degrees from second selected ones of said plurality of secondary winding circuits, and fifth selected ones of said plurality of secondary winding circuits are delayed in phase by generally 24 degrees from second selected ones of said plurality of secondary winding circuits.

39. The electric drive of claim 25 wherein said rectifier includes a diode bridge, and said smoothing filter includes capacitors.

40. The electric drive of claim 25 wherein said converter further comprises plurality of semiconductor switches, each of said plurality of semiconductor switches operably connected to said rectifier and said smoothing filter, selected ones of said plurality of semiconductor switches being connected to selected others of said plurality of semiconductor switches in an H-bridge configuration, and each of said plurality of semiconductor switches being connected to said control circuit.

41. The electric drive of claim 40 wherein said semiconductor switches are power transistors.

42. The electric drive of claim 25 further comprising a bypass circuit, connected between a first phase output line segment and a second phase output line segment, for selectively bypassing at least one of said plurality of power cells.

43. The electric drive of claim 25 wherein said modulation control means further comprises:
   a. means for selectively applying at least one control signal to said plurality of power cells so that each of said plurality of said power cells conducts a current at a predetermined voltage, with a predetermined polarity, and for a predetermined duration; and
   b. means for interdigitating a preselected number of carrier signals to each of said plurality of said power cells, so that harmonic components in a power frequency spectrum are generally attenuated.

44. An electric drive for use with a multi-phase AC load comprising:
   (a) a multi-phase power transformer, said power transformer having at least one primary winding circuit and a plurality of secondary winding circuits, said primary winding circuit being electrically connectable to a source of multi-phase AC power;
   (b) a plurality of power cells, each of said plurality of power cells having an input connected with are respective one of said plurality of secondary winding circuits, each of said plurality of power cells having a single-phase controllable output to such multi-phase AC load, and respective ones of said plurality of power cells being serially connected with respective others of said plurality of power cells in each phase output line to such multi-phase AC load;
   (c) each of said plurality of power cells having
      i. a rectifier electrically connected to a respective one of said plurality of secondary winding circuits and having an electrical output
      ii. a smoothing filter connected to said output of said rectifier,
      iii. a converter connected to said smoothing filter, and the output of said converter connected to respective one of said phase output lines such multi-phase load;
   (d) modulation control means connected to each said converter, so that the output to said converter is controlled, said control means having
      i. a plurality of local modulator controllers connected to respective ones of said plurality of power cells, and
      ii. a master modulator controller operably connected to each of said plurality of local modulator controllers;
   (e) a bypass circuit, connected between a first phase output line segment and a second phase output line segment, for selectively bypassing at least one of said plurality of power cells, said bypass circuit further having
      a. a diode bridge connected between said first phase output line segment and said second phase output line segment, and said diode bridge having a gating control input line and a gating control output line;
      b. gating means, connected between said gating control input line and said gating control output line, for selectively providing a current path for said load current through said diode bridge;
      c. voltage snubbing means for limiting a maximum voltage between said first phase output line segment and said second phase output line segment; and
      d. bypass means for selectively permitting said load current to flow through said bypass circuit.

45. The electric drive of claim 44 wherein
   said bypass gating means includes at least one semiconductor gating device,
   said bypass control means includes gate firing means and voltage snubbing means, and
   said voltage snubbing means includes a voltage snubbing circuit and at least one inductor of a preselected impedance.

46. A method of controlling multi-phase AC power to a load comprising:
   a. transforming an input voltage to a plurality of secondary voltage sources;
   b. supplying power to each phase of said load from a plurality of power cells fed from said plurality of secondary voltage sources;
   c. applying a multi-phase current to said load from a plurality of said power cells connected in series in each phase to said load;
   d. selectively controlling the output of said power cells to one of a preselected positive voltage level, a preselected negative voltage level, and a generally zero voltage level;
   (e) shifting in phase a plurality of said secondary power sources from said input voltage; and
   (f) selectively controlling a switching event of each of said power cells so that said switching event of respective one of said plurality of said power cells in phase output line is spaced in time from said switching event of respective others of said plurality of power cells in respective phase output line thereby reducing harmonic components in said phase output lines to said load;

(g) selectively applying at least one control signal to said plurality of said power cells so that each of said plurality of power cells conducts a current at a predetermined voltage, with a predetermined polarity, and for a predetermined duration; and h) interdigitating a preselected lumber of carrier signals to each of said plurality of said power cells so that harmonic components in a power frequency spectrum are generally attenuated.

47. The method of claim 46 further comprising selectively providing a current path for a load current in a bypass circuit for shunting at least one of said plurality of power cells in one phase output line.

48. The method of claim 47 further comprising:

a. limiting the voltage output of respective others of said plurality of power cells in respective others of said phase output lines; and b. selectively permitting said load current to flow through said bypass circuit.

\* \* \* \* \*